(12) United States Patent
Senno et al.

(10) Patent No.: US 8,596,310 B2
(45) Date of Patent: Dec. 3, 2013

(54) SEALING AND PUMP-UP DEVICE (75) Inventors: Yoshikazu Senno, Kodaira (JP); Yuji Takeda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 115 days.

(21) Appl. No.: 13/265,612

(22) PCT Filed: Apr. 23, 2010

(86) PCT No.: PCT/JP2010/057273
§ 371 (c)(1), (2), (4) Date: Oct. 21, 2011

(87) PCT Pub. No.: WO2010/123113
PCT Pub. Date: Oct. 28, 2010

(65) Prior Publication Data
US 2012/0037267 A1 Feb. 16, 2012

(30) Foreign Application Priority Data
Apr. 23, 2009 (JP) .................................. 2009-105240

(51) Int. Cl.
*B65B 31/00* (2006.01)
(52) U.S. Cl.
USPC ............... 141/38; 141/67; 141/105; 141/114; 141/330; 81/15.6
(58) Field of Classification Search
USPC ............. 141/38, 67, 100, 105, 114, 231, 313, 141/329, 330; 152/502, 415; 81/15.6
See application file for complete search history.

(56) References Cited

U.S. PATENT DOCUMENTS

| 6,964,284 B2 * | 11/2005 | Eckhardt | 141/38 |
| 6,968,869 B2 * | 11/2005 | Eckhardt | 141/38 |
| 2004/0159365 A1 * | 8/2004 | Cowan et al. | 141/38 |
| 2004/0216806 A1 * | 11/2004 | Eckhardt | 141/38 |

FOREIGN PATENT DOCUMENTS

JP 2005-199618 A 7/2005
(Continued)

OTHER PUBLICATIONS

International Search Report for PCT/JP2010/057273 dated May 25, 2010.

*Primary Examiner* — Jason K Niesz
(74) *Attorney, Agent, or Firm* — Sughrue Mion, PLLC (57) ABSTRACT

A sealing and pump-up device capable of suppressing sealing agent contained in a sealing agent container body from leaking and preventing damage to a casing body even if an operator mistakenly attempts to remove the sealing agent container body. A connection body 70 is retained to a seal opening device 60 by fitting force between first claws 94A and a leg portion 36 and between second claws 96A and the leg portion 36. An operator might conceivably mistakenly attempt to remove a liquid agent container 18 from the seal opening device 60. However, the fixing force of the screw 128 in the circular hole 122 is determined by such factors as the shape of each member so as to be weaker than the sum of the fitting force (retaining force) between the first claws 94A and the leg portion 36 and the fitting force (retaining force) between the second claws 96A and the leg portion 36. Accordingly, fixing of the screw 128 in the circular hole 122 is released if an operator attempts to remove the liquid agent container 18 from the seal opening device 60, and the sealing agent 32 contained in the liquid agent container 18 can be suppressed from leaking and damage to the casing body 16 can also be prevented.

6 Claims, 10 Drawing Sheets

(56) References Cited

FOREIGN PATENT DOCUMENTS

| | | | |
|---|---|---|---|
| JP | 2008-023909 A | 2/2008 |
| JP | 2008-155400 A | 7/2008 |
| JP | 2008-175345 A | 7/2008 |
| JP | 2008-307860 A | 12/2008 |

* cited by examiner

SEALING AND PUMP-UP DEVICE

CROSS REFERENCE TO RELATED APPLICATIONS

This application is a National Stage of International Application No. PCT/JP2010/057273, filed on Apr. 23, 2010, which claims priority from Japanese Patent Application No. 2009-105240, filed Apr. 23, 2009, the contents of all of which are incorporated herein by reference in their entirety.

TECHNICAL FIELD

The present invention relates to a sealing and pump-up device for injecting a sealing agent into a punctured pneumatic tire in order to seal the pneumatic tire and for then supplying compressed air into the pneumatic tire to raise the internal pressure of the pneumatic tire.

BACKGROUND ART

A sealing and pump-up device is described in Patent Document 1 (Japanese Patent Application Laid-Open (JP-A) No. 2008-175345) for repairing a pneumatic tire that has been punctured with a sealing agent and pumping the tire up to the stipulated internal tire pressure without changing the tire or wheel.

More specifically configuration is made such that a liquid agent container is fixed to a device main body by screwing an outflow section of a liquid agent container, containing a sealing agent to be fed into a tire, into the device main body of a sealing and pump-up device.

DISCLOSURE OF INVENTION

Technical Problem

However, in a conventional sealing and pump-up device, there are conceivably occasions of the threaded portion of the outflow section of the liquid agent container becoming loose when an operator mistakenly attempts to forcibly remove the liquid agent container from the device main body, leading to the sealing agent in the liquid agent container leaking out.

In consideration of the above circumstances the present invention is directed towards suppressing leaking of a sealing agent contained in a liquid agent container (sealing agent container body) and also preventing damage to a casing body even when an operator mistakenly attempts to remove the liquid agent container.

Solution to Problem

A sealing and pump-up device of a first aspect of the present invention includes: a sealing agent container body for containing a sealing agent, provided with an outflow section for letting the contained sealing agent flow out; a seal opening device for opening a seal member that seals the outflow section when the sealing agent container body is mounted to the seal opening device; a seal opening device retaining member for retaining the mounted state of the sealing agent container body to the seal opening device; a compressed air supply member that is connected to the seal opening device and supplies compressed air into the sealing agent container body sealed with the seal member; a fluid joint feed tube that is connected to the sealing agent container body and guides, into a pneumatic tire, sealing agent that has flowed out from the outflow section after the seal member is opened by the seal opening device and the compressed air supplied into the sealing agent container body by the compressed air supply member; and a seal opening device fixing section for fixing the seal opening device to a casing body housing the compressed air supply member, wherein a fixing force of the seal opening device fixing section is weaker than a retaining force of the seal opening device retaining member.

According to the above configuration, the seal member sealing the outflow section of the sealing agent container body is opened when the sealing agent container body is mounted to the seal opening device, and the sealing agent flows out from the outflow section of the sealing agent container body. The compressed air supply member connected to the seal opening device also supplies compressed air into the sealing agent container body whose seal member has been ruptured.

The fluid joint feed tube connected to the sealing agent container body further guides into the pneumatic tire the sealing agent that has flowed out from the outflow section and the compressed air supplied into the sealing agent container body by the compressed air supply member.

The seal opening device retaining member thereby retains the sealing agent container body mounted to the seal opening device and the seal opening device fixing section fixes the seal opening device to the casing body.

The fixing force of the seal opening device fixing section is set weaker than the retaining force of the seal opening device retaining member.

Consequently, the mounted state of the sealing agent container body to the seal opening device is retained in a by the seal opening device retaining member even if an operator mistakenly attempts to remove the sealing agent container body, but fixing of the seal opening device to the casing body by the seal opening device fixing section is released. The sealing agent contained in the sealing agent container body can thereby be suppressed from leaking and damage to the casing body can also be prevented.

The above aspect may be configured such that the seal opening device fixing section includes: an indentation shaped female member provided to the seal opening device; and a male member that is inserted through an attachment hole formed in the casing body into the indentation shaped female member to couple to the female member and fix the seal opening device to the casing body.

According to such a configuration, the seal opening device is fixed to the casing body by the male member being inserted through the attachment hole formed in the casing body and into the indentation shaped female member so as to couple to the female member.

Consequently, even if an operator mistakenly attempts to remove the sealing agent container body, the sealing agent contained in the sealing agent container body can be suppressed from leaking and damage to the casing body can also be prevented due to the coupling between the female member and the male member being released.

The above aspect may be configured such that: the female member is an indentation shaped circular hole formed in the seal opening device; the male member is a pin member including a circular pillar shaped neck portion for inserting into the circular hole; and the neck portion of the pin member is fixed to the circular hole with an adhesive agent so as to fix the seal opening device to the casing body.

According to the above configuration, the seal opening device is fixed to the casing body by inserting the neck portion of the pin member through the attachment hole formed in the casing body into the indentation shaped circular hole, and fixing the neck portion into the circular hole with an adhesive agent.

Consequently, even if an operator mistakenly attempts to remove the sealing agent container body, the sealing agent contained in the sealing agent container body can be suppressed from leaking and damage to the casing body can also be prevented due to releasing fixing of the neck portion to the circular hole with the adhesive agent.

The above aspect may be configured such that: the female member is a nut insert fixed into the seal opening device; the male member is a bolt for threading into the nut insert; and the bolt is threaded into the nut insert so as to fix the seal opening device to the casing body.

According to the above configuration, the seal opening device is fixed to the casing body by the bolt being inserted through the attachment hole formed in the casing body and threaded into the nut insert fixed into the seal opening device.

Consequently, even if an operator mistakenly attempts to remove the sealing agent container body, the sealing agent contained in the sealing agent container body can be suppressed from leaking and damage to the casing body can also be prevented due to releasing threading of the bolt and the nut insert.

The above aspect may be configured such that: the female member is an indentation shaped circular hole formed in the seal opening device; the male member is a screw for screwing into the circular hole; and the screw is screwed into the circular hole so as to fix the seal opening device to the casing body.

According to the above configuration, the seal opening device is fixed to the casing body by the screw being inserted through the attachment hole formed in the casing body and screwed into the indentation shaped circular hole formed in the seal opening device.

Consequently, even if an operator mistakenly attempts to remove the sealing agent container body, the sealing agent contained in the sealing agent container body can be suppressed from leaking and damage to the casing body can also be prevented due to releasing the screwed in state of the screw into the circular hole.

The above aspects may be configured such that: a non-meshing portion is provided to the nut insert or to the circular hole such that the non-meshing portion does not mesh with the bolt or the screw; and the fixing force of the seal opening device fixing section is tuned by increasing or decreasing the non-meshing portion.

According to the above configuration, the fixing force of the seal opening device fixing section is tuned by increasing or decreasing the non-meshing portion provided to the nut insert or to the circular hole.

Consequently, tuning of the fixing force of the seal opening device fixing section can be accomplished with a simple method.

Advantageous Effects of Invention

According to the present invention the sealing agent contained in the sealing agent container body can be suppressed from leaking and damage to the casing body can be prevented even if an operator mistakenly attempts to remove the sealing agent container body.

DESCRIPTION OF EMBODIMENTS

Explanation follows regarding an example of a sealing and pump-up device according to a first exemplary embodiment of the present invention, with reference to FIG. 1 to FIG. 8.

Overall Configuration

Figure 8:
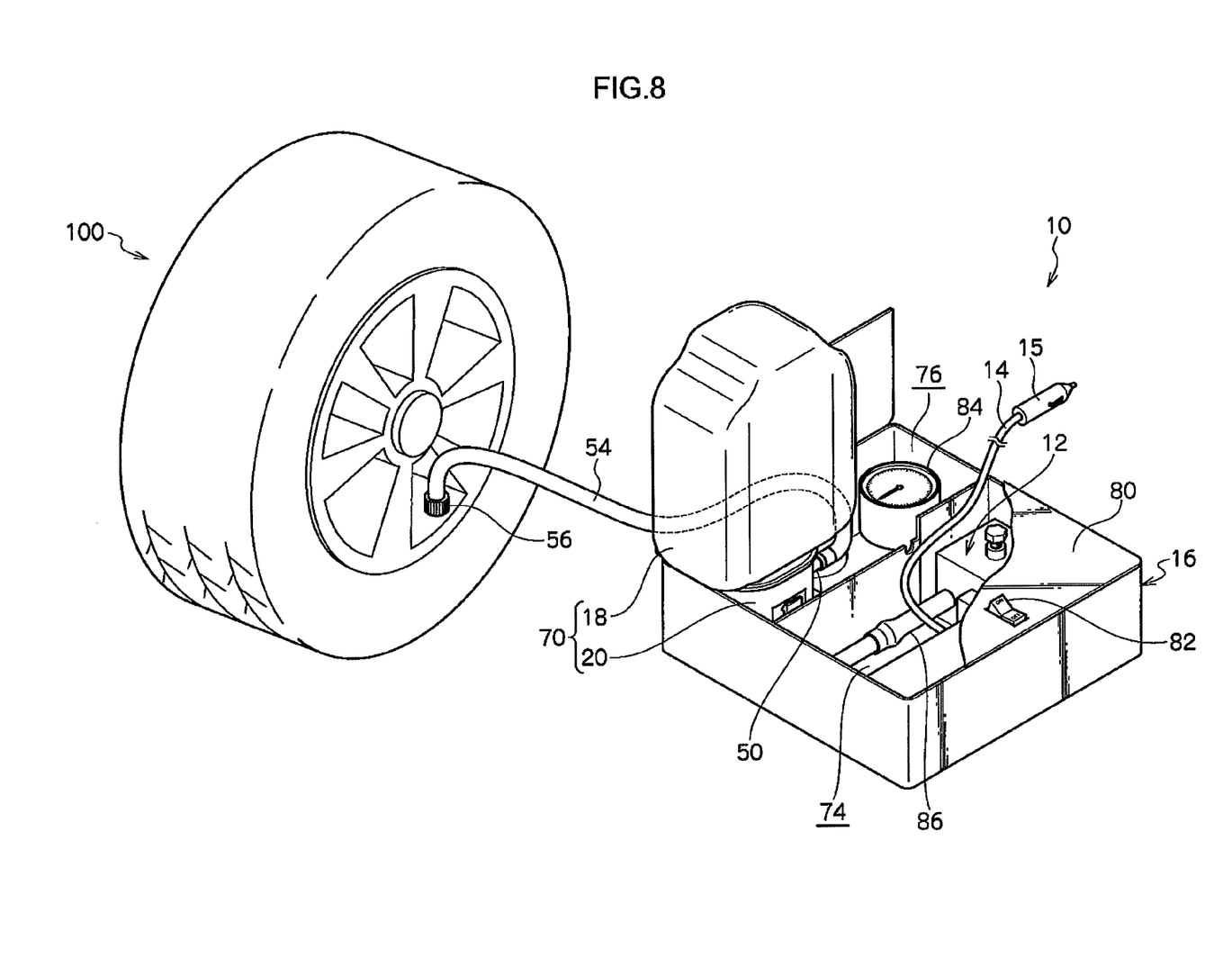
FIG. 8 is a perspective view illustrating a sealing device according to the first exemplary embodiment of the present invention.

As shown in FIG. 8, a sealing and pump-up device 10 (referred to below simply as a sealing device) is device employed when a pneumatic tire 100 (referred to below simply as tire) mounted to a vehicle such as a car experiences a puncture, and is employed to repair the puncture hole in the tire 100 with a sealing agent and re-inflate (pump-up) the tire 100 to its stipulated internal pressure.

Figure 2:
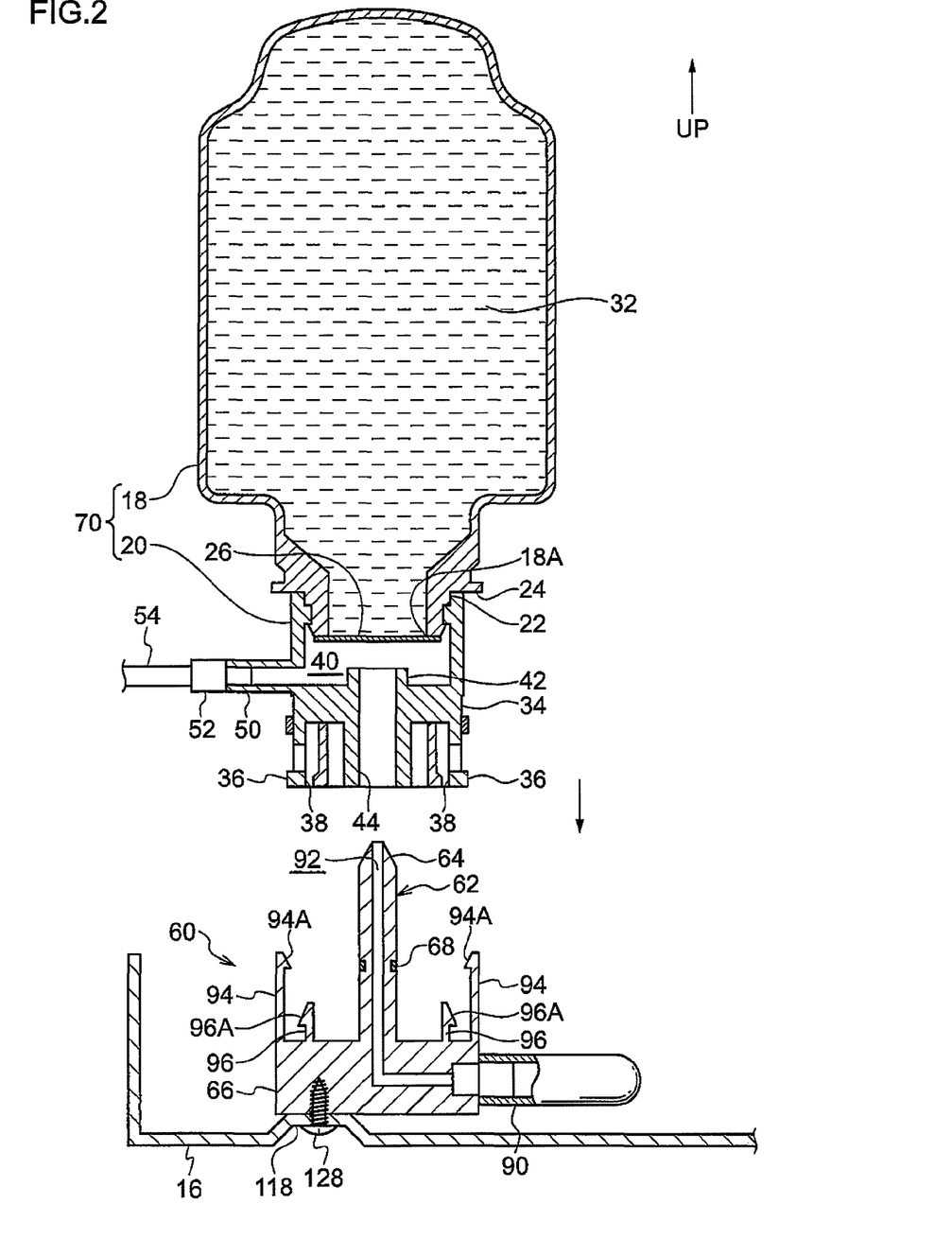
FIG. 2 is a cross-section illustrating a liquid agent container, injection unit and seal opening device employed in a sealing device according to the first exemplary embodiment of the present invention.

As shown in FIG. 2 and FIG. 8, the sealing device 10 is configured including: a box shaped casing body 16; a liquid agent container 18 containing a sealing agent 32 employed for repairing puncture hole in the sealing device 10; an injection unit 20 connected to an outflow port section 18A of the liquid agent container 18; a seal opening device 60 that when inserted into a rupture tool insertion hole 44 opens an aluminum seal 26 that seals off the outflow port section 18A of the liquid agent container 18 so as to communicate with a pressurized liquid feed chamber 40 of the injection unit 20, the seal opening device 60 attaching below the injection unit 20 by claws 96A; a compressor unit 12 that generates compressed air and is housed in the casing body 16 at a position distanced from the seal opening device 60; an air hose 86 for guiding compressed air generated by the compressor unit 12 into the liquid agent container 18 whose aluminum seal 26 has been ruptured; and a joint hose 54 connected to the injection unit 20 for guiding towards the tire 100 the sealing agent 32 that has flowed out through the outflow port section 18A into a pressurized liquid feed chamber 40 and compressed air.

Casing Body

Figure 7:
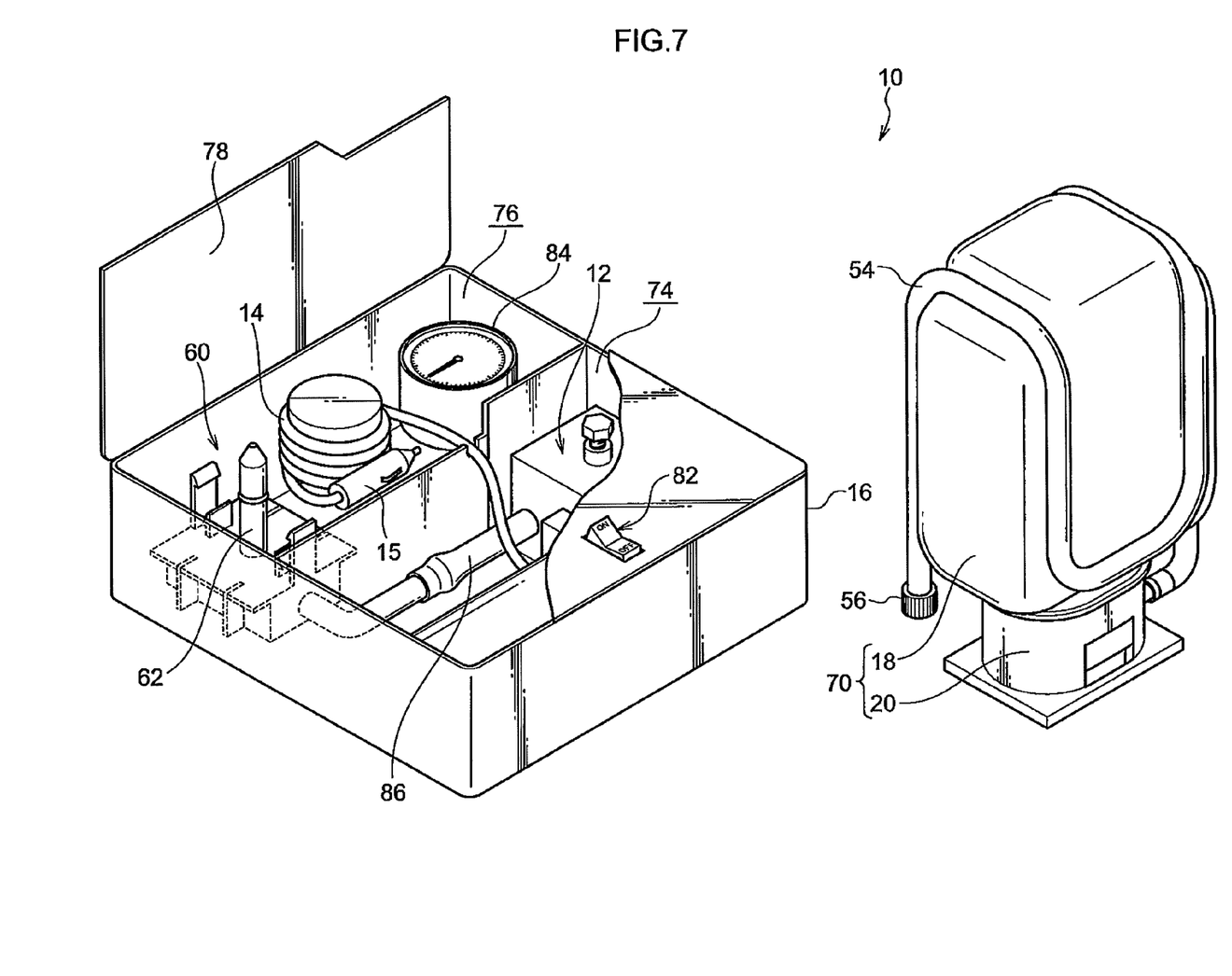
FIG. 7 is a perspective view illustrating a sealing device according to the first exemplary embodiment of the present invention.

As shown in FIG. 7, the inside of the casing body 16 is segmented into a compressor chamber 74 housing the compressor unit 12 and a housing compartment 76 for other items.

An opening and closing lid 78 is provided to the housing compartment 76. The power source cable 14 extending out from the compressor unit 12, the seal opening device 60, and other items such as a pressure gauge 84 for measuring the pressure of compressed air generated by the compressor unit 12 are housed in the housing compartment 76. The seal opening device 60 is connected to the air hose 86 that extends out from the compressor unit 12.

The sealing device 10 of the present exemplary embodiment is configured such that a connected body 70, serving as a sealing agent storage body and formed by the liquid agent container 18 connected to the injection unit 20, is stored separately from the casing body 16.

When the device is to be used, as shown in FIG. 8, the lid 78 of the casing body 16 is opened and the power source cable 14 is taken out from the housing compartment 76, and the connected body 70 is mounted to the seal opening device 60.

A manual (not shown in the drawings) is attached to the back face of the lid 78 describing operational procedure and cautions that apply when using the sealing device 10. The user manual is hence placed so as to be readily noticed when opening the lid 78 to use the sealing device 10.

The power switch 82 for the compressor unit 12 is provided on a top plate 80 disposed over the compressor chamber 74.

Compressor Unit

As shown in FIG. 7, the compressor unit 12 is configured from components such as an air compressor, drive motor for an air compressor and a drive circuit for the drive motor. The compressor unit 12 is connected to the power source cable 14 housed in the housing compartment 76. A plug 15 suitable for insertion into the socket of a cigarette lighter installed in a vehicle is provided at the leading end of the power source cable 14.

Inserting the plug 15 into a cigarette lighter socket enables power to be supplied to the drive circuit from a vehicle mounted battery, such that power is supplied to the drive circuit when the above power switch 82 is switched on.

Configuration is made such that the compressed air generated by the air compressor is fed to the seal opening device 60 through the air hose 86 extending out from the compressor unit 12.

Liquid Agent Container

As shown in FIG. 2, the liquid agent container 18 contains the sealing agent 32, and a circular cylindrical shaped neck portion 22 is formed to the liquid agent container 18 such that the liquid agent container 18 has a smaller diameter at a bottom end portion than the diameter at a container body portion on the top side.

An opening on the leading end of the neck portion 22 (the bottom end as illustrated in FIG. 2) is configured by the outflow port section 18A through which the sealing agent 32 flows out from the liquid agent container 18. The outflow port section 18A is sealed over with the membranous aluminum seal 26. A step portion 24 is formed at an intermediate portion of the neck portion 22 so as to extend towards the peripheral direction outside.

Slightly more of the sealing agent 32 is contained in the liquid agent container 18 than a standard amount corresponding to the type, size and the like of the tire 100 (see FIG. 8) requiring repair by the sealing device 10.

Injection Unit

As shown in FIG. 2, the injection unit 20 includes a unit main body section 34 formed in a bottomed substantially circular cylindrical shape that is open at the top end, and a leg portion 36 that extends out towards the outer peripheral side from a bottom end portion of the unit main body section 34.

The connected body 70 is connected and fixed to the injection unit 20 by inserting the bottom end side of the neck portion 22 of the liquid agent container 18 inside the inner periphery of the unit main body section 34 until the step portion 24 of the neck portion 22 makes contact with the top end portion of the unit main body section 34.

When the neck portion 22 is then welded to the unit main body section 34 the pressurized liquid feed chamber 40 is formed between the inner wall face of the unit main body section 34 and the aluminum seal 26. The pressurized liquid feed chamber 40 is made in communication with the inside of the liquid agent container 18 when the aluminum seal 26 is ruptured by the seal opening device 60. Namely, the sealing agent 32 flows out from the outflow port section 18A when the aluminum seal 26 is opened by rupturing of the outflow port section 18A and is caused to flow into the pressurized liquid feed chamber 40.

A substantially circular cylindrical shaped internal cylindrical portion 42 is formed coaxially at the inner peripheral side of the unit main body section 34. The internal cylindrical portion 42 is configured with the circular cross-section shaped rupture tool insertion hole 44 at the inside, passing through along the central axis from the bottom end face of the injection unit 20 to the top end face of the internal cylindrical portion 42.

A circular cylindrical shaped air and liquid joint supply tube 50 is also integrally formed at a peripheral wall portion of the unit main body section 34 so as to extend towards the peripheral outside. The inside of the air and liquid joint supply tube 50 is in communication with the pressurized liquid feed chamber 40, and the leading end section of the air and liquid joint supply tube 50 is connected to the joint hose 54 through a nipple 52.

As shown in FIG. 8, a valve adapter 56 suitable for connection to a tire valve (not shown in the drawings) of the tire 100 is provided at the leading end section of the joint hose 54.

Seal Opening Device

As shown in FIG. 2, the seal opening device 60 includes a bar shaped insertion portion 62 for inserting into the rupture tool insertion hole 44, and a substantially rectangular shaped base portion 66 formed at the base end portion of the insertion portion 62. A connecting tube 90 suitable for connecting to the other end portion of the above air hose 86 is provided at a side face of the base portion 66, and the air hose 86 is connected to the connecting tube 90 (see FIG. 8).

An air path 92 is formed in the seal opening device 60 so as to pass from the connecting tube 90 through the base portion 66 and to open out at the leading end of the insertion portion 62.

A leading end portion 64 of the insertion portion 62 is configured with a profile that easily ruptures the aluminum seal 26 (a substantially circular cone shape in the present exemplary embodiment). The outer peripheral face of the insertion portion 62 is formed with an insertion fitting groove, and an O-ring 68 is fitted into the insertion fitting groove.

The length of the insertion portion 62 is set longer than the dimension from the bottom end of the rupture tool insertion hole 44 to the aluminum seal 26. Accordingly the leading end portion 64 of the insertion portion 62 ruptures the aluminum seal 26 when the insertion portion 62 of the seal opening device 60 has been completely inserted into the rupture tool insertion hole 44, with the leading end portion 64 reaching a position further up than the aluminum seal 26.

When the insertion portion 62 is in the inserted state in the rupture tool insertion hole 44, the O-ring 68 presses against the inner peripheral face of the rupture tool insertion hole 44 over the entire circumference. Accordingly, the rupture tool insertion hole 44 is in a closely sealed state due to the O-ring 68 when the whole of the insertion portion 62 has been inserted into the rupture tool insertion hole 44, namely a sealed state of the rupture tool insertion hole 44 is achieved.

A first support pillar 94 is provided at the vicinity of each edge of the base portion 66. The first support pillars 94 are resiliently deformable and formed so as to protrude up at right angles from the top face of the base portion 66. A triangular shaped first claw 94A is integrally formed at the leading end side of each of the first support pillars 94 on the face on the side facing towards the insertion portion 62.

Resiliently deformable second support pillars 96 are provided further towards the insertion portion 62 side than the first support pillars 94, projecting up at right angles from the top face of the base portion 66 to a height that is shorter than the first support pillars 94. A triangular shaped second claw 96A is integrally formed at the leading end side of each of the second support pillars 96 on the face on the side facing towards the first support pillar 94.

The disposed separation between the first support pillars 94 is wider than the length of the leg portion 36 in the short direction, and the length between the first claws 94A is narrower than the length of the leg portion 36 in the short direction. The first claws 94A accordingly latch over edge portions of the leg portion 36.

More specifically, when the insertion portion 62 of the seal opening device 60 is inserted into the rupture tool insertion hole 44, the first claws 94A deform resiliently towards the outside as they ride over the short direction edge portions of the leg portion 36, the separation distance between first claws 94A is made wider, and the first support pillars 94 resiliently revert to their original shape when the first claws 94A have passed over the short direction edge portions of the leg portion 36. The first claws 94A thereby catch on the short direction edge portions of the leg portion 36.

The second support pillars 96 are insertable into through holes 38 formed in the leg portion 36 of the injection unit 20, such that when the second support pillars 96 have been inserted into the through holes 38 the second claws 96A latch onto the edge portions of the through holes 38 in the leg portion 36. Accordingly configuration is such that the injection unit 20 is retained in a mounted state to the seal opening device 60.

Further details relating to the attachment structure of the seal opening device 60 for attaching the seal opening device 60 to the casing body 16 are described later.

Operation of Sealing and Pump-Up Device

Explanation follows regarding an operational procedure to repair a punctured tire 100 using the sealing device 10 of the present exemplary embodiment.

As shown in FIG. 8, when the tire 100 sustains a puncture, a user first takes out the casing body 16 from a storage space in a vehicle, places the casing body 16, for example on a road surface, such that the power switch 82 and the pressure gauge (not shown in the drawings) face upwards, then opens the lid 78 to open the housing compartment 76.

A user is able to perform operations while following and confirming with the manual due to the manual being attached to the back face of the opened lid 78.

A user then takes out the separately-stored connected body 70 (see FIG. 7) from a storage space in the vehicle and connects the valve adapter 56 of the joint hose 54, which is already connected to the air and liquid joint supply tube 50 of the injection unit 20 of the connected body 70, to the tire valve (not shown in the drawings) of the tire 100.

A user takes the power source cable 14 stored in the housing compartment 76 out from the housing compartment 76, inserts the plug 15 into the cigarette lighter socket (not shown in the drawings) installed in the vehicle, and starts the vehicle engine. Accordingly power supply from a vehicle battery (DC 12V) to the drive circuit of the compressor unit 12 is enabled.

Then, as shown in FIG. 2, the injection unit 20 turned to face downwards, and the injection unit 20 is mounted to the seal opening device 60. The aluminum seal 26 is ruptured (opened) by the leading end portion 64 when the entire insertion portion 62 is inserted into the rupture tool insertion hole 44.

Figure 1:
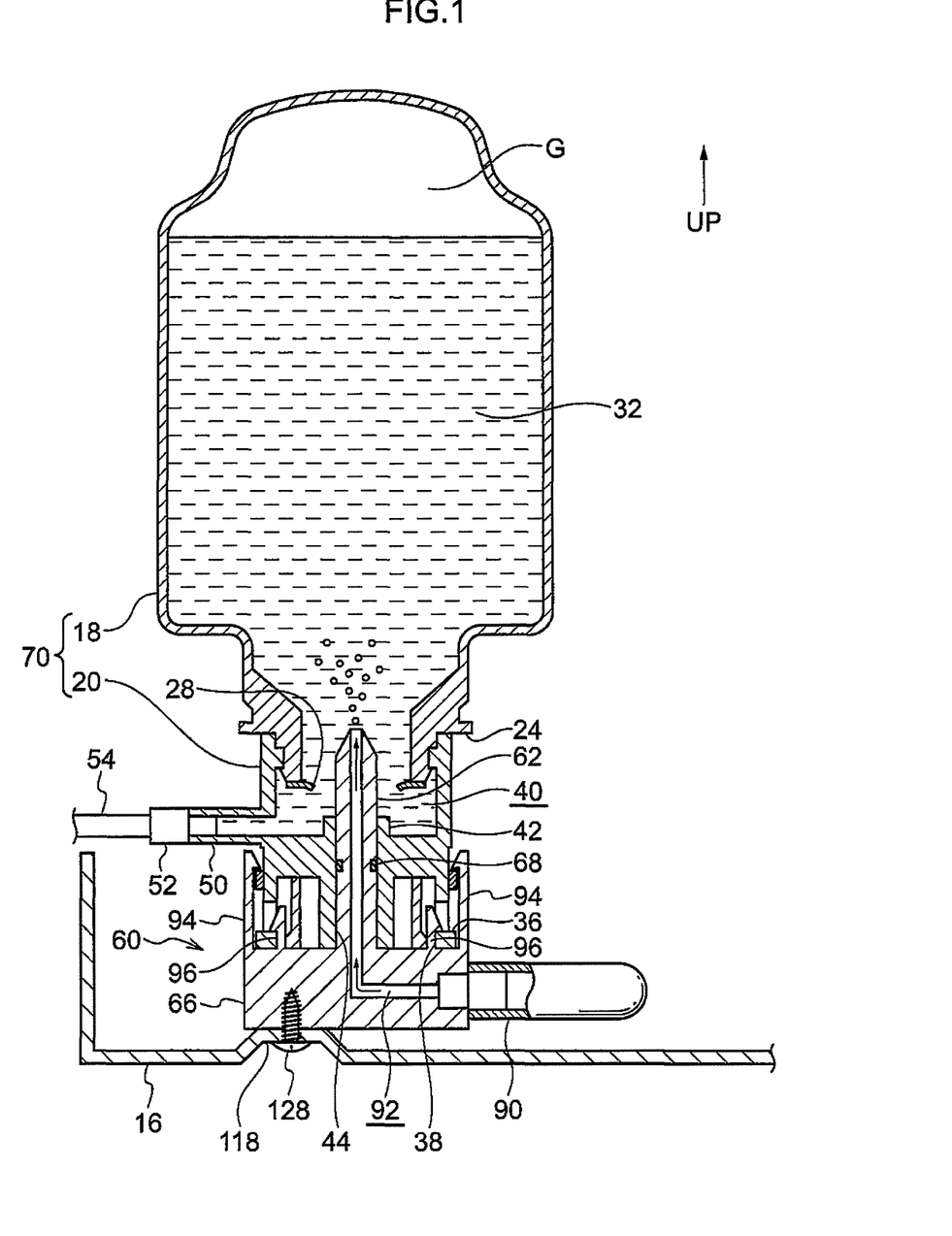
FIG. 1 is a cross-section illustrating a liquid agent container, injection unit and seal opening device employed in a sealing device according to a first exemplary embodiment of the present invention.

As shown in FIG. 1, when the leading end portion 64 ruptures the aluminum seal 26, the first claws 94A resiliently deform towards the outside on riding over the short direction edge portions of the leg portion 36 thereby widening the separation between the first claws 94A. When the first claws 94A have passed over the short direction edge portions of the leg portion 36, both the first support pillars 94 revert to their original shape. The first claws 94A accordingly latch onto the short direction edge portions of the leg portion 36.

The second claws 96A are also inserted into the through holes 38 of the injection unit 20 and latch onto the edge portion of the through holes 38, such that the leading end portions 64 are retained in a state intruding inside the liquid agent container 18.

When this occurs the O-ring 68 provided to the insertion portion 62 makes contact against the inside face of the rupture tool insertion hole 44, sealing the rupture tool insertion hole 44. Liquid is thereby suppressed from leaking out from the rupture tool insertion hole 44.

When the aluminum seal 26 is ruptured the sealing agent 32 inside the liquid agent container 18 flows out through a hole 28 opened in the aluminum seal 26 and into the pressurized liquid feed chamber 40. Then when the power switch 82 is switched on to actuate the compressor unit 12, the compressed air generated by the compressor unit 12 is fed into the liquid agent container 18 through the air path 92. When the compressed air is fed into the liquid agent container 18 the compressed air rises towards the top inside the liquid agent container 18 to form a space (air layer G) above the sealing agent 32 inside the liquid agent container 18.

The sealing agent 32 pressed by air pressure from the air layer G is pushed out through the hole 28 opened in the aluminum seal 26 and into the pressurized liquid feed chamber 40. The sealing agent 32 in the pressurized liquid feed chamber 40 is then fed on into the pneumatic tire 100 through the joint hose 54. When all of the sealing agent 32 has been fed out from the pressurized liquid feed chamber 40 and the joint hose 54 and fed into the tire 100, compressed air is then supplied into the tire 100 through the liquid agent container 18, the pressurized liquid feed chamber 40 and the joint hose 54.

As shown in FIG. 8, the compressor unit 12 is then stopped when a user has confirmed that the internal pressure in the tire 100 has reached the stipulated pressure using the pressure gauge 84, and the user then detaches the valve adapter 56 from the tire valve (not shown in the drawings).

A user then, within a specific period of time from when the tire 100 has been completely inflated, performs preparatory running over a specific distance (for example 10 km) using the tire 100 that has been injected with the sealing agent 32. The sealing agent 32 inside the tire 100 is thereby spread out uniformly, and the sealing agent 32 fills the puncture hole and closes off the puncture hole.

After completing preparatory running, the user then re-measures the internal pressure of the tire 100 and, as required, reconnects the valve adapter 56 of the joint hose 54 to the tire valve and re-actuates the compressor unit 12 to increases the pressure of the tire 100 to the stipulated internal pressure. Puncture repair to the tire 100 is thereby completed, enabling the tire 100 to be run at up to a specific speed (say 80 km/h) within a specific distance range.

Configuration of Relevant Portions

Explanation follows regarding an attachment structure of the seal opening device 60 for the attaching the seal opening device 60 to the casing body 16.

Figure 6:
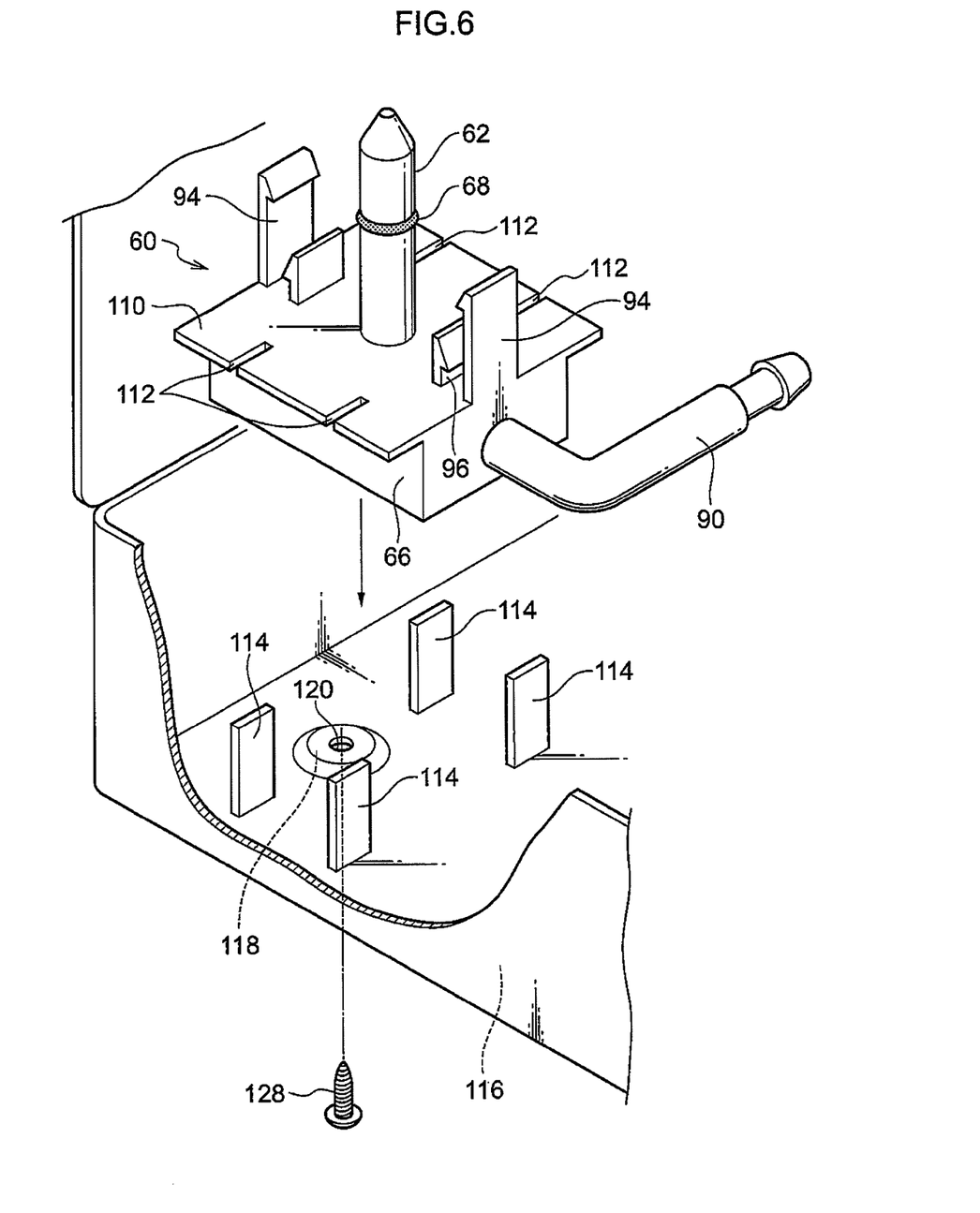
FIG. 6 is an exploded perspective view illustrating a seal opening device and casing body employed in a sealing device according to the first exemplary embodiment of the present invention.

As shown in FIG. 6, a plate member 110 that supports the first support pillars 94 and the second support pillars 96 of the seal opening device 60 is provided with plural U-shaped grooves 112. Ribs 114 that fit into the U-shaped grooves 112 in an attached state of the seal opening device 60 to the casing body 16 are integrally formed to the casing body 16.

A countersunk portion 118 is formed to a bottom plate 116 of the casing body 16 with a countersunk profile projecting inwards. A through hole 120 is formed to the countersunk portion 118 so as to communicate an inside portion of the countersunk portion 118 with an outside portion.

Figure 4:
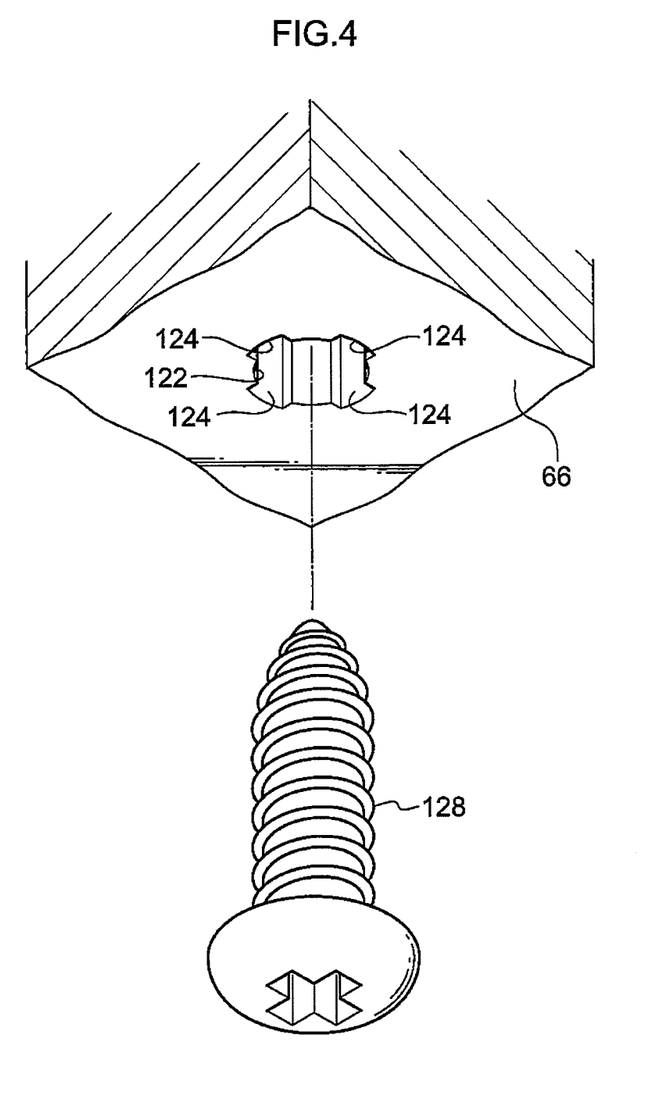
FIG. 4 is a perspective view illustrating a fixing structure of a seal opening device to a casing body employed in a sealing device according to the first exemplary embodiment of the present invention.
Figure 5:
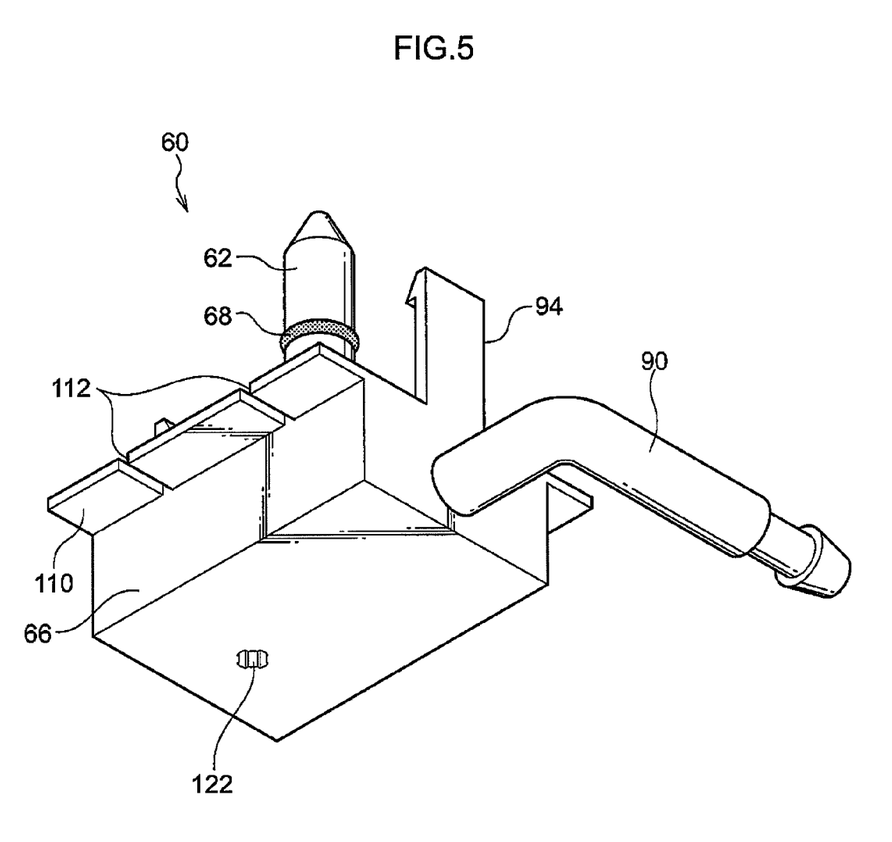
FIG. 5 is a perspective view from below illustrating a seal opening device employed in a sealing device according to the first exemplary embodiment of the present invention.

As shown in FIG. 4 and FIG. 5, an indentation shaped circular hole 122 is formed in the bottom face of the base portion 66 so as to align with the through hole 120 (see FIG. 6), and a screw 128 is screwed in through the through hole 120 into the circular hole 122.

Grooved portions 124 are provided so as to extend along the axial direction of the circular hole 122 on the inner peripheral face of the circular hole 122 so as to widen out the circular hole 122 from the center in four directions. The grooved portions 124 are configured so as not to mesh with the screw 128. Namely, increasing or decreasing the grooved portions 124 changes the meshing amount of the screw 128, such that the fixing force of the screw 128 to the circular hole 122 can be tuned.

Figure 3:
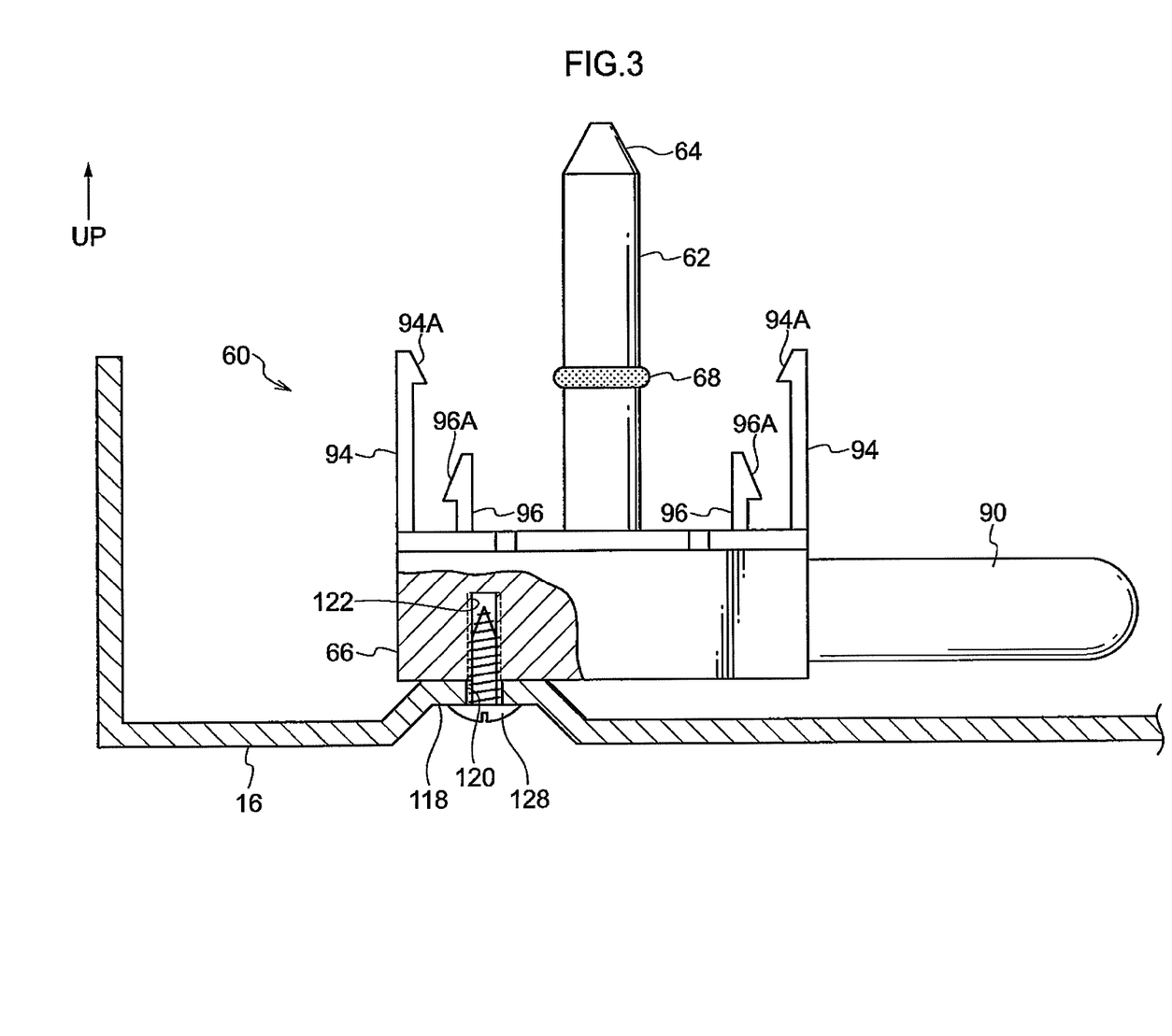
FIG. 3 is a cross-section illustrating a fixing structure of a seal opening device to a casing body employed in a sealing device according to the first exemplary embodiment of the present invention.

Then, as shown in FIG. 3, the seal opening device 60 is attached to the casing body 16 by screwing the screw 128 from below through the through hole 120 provided in the countersunk portion 118 and into the circular hole 122.

The fixing force of the screw 128 to the circular hole 122 is determined by such factors as the shape of each member in order that the fixing force is weaker than the sum of the fitting force (retaining force) of the first claws 94A and the leg portion 36, and the fitting force (retaining force) of the second claws 96A and the leg portion 36.

The force (N) required to remove the injection unit 20 from the casing body 16 by pulling out the injection unit 20 that has been fixed to the casing body 16 may be employed as a method for measuring the fixing force of the screw 128 to the circular hole 122. The force (N) required to remove the injection unit 20 from the seal opening device 60 by pulling out the injection unit 20 that has been fixed to the seal opening device 60 may be employed as a method for measuring the sum of the fitting force (retaining force) of the first claws 94A and the leg portion 36, and the fitting force (retaining force) of the second claws 96A and the leg portion 36.

Operation and Effect of the Relevant Portion Configuration

As shown in FIG. 1, in order to feed the sealing agent 32 into the tire 100, the connected body 70 retained to the seal opening device 60 by the fitting force (retaining force) between the first claws 94A and the leg portion 36 and between the second claws 96A and the leg portion 36.

Cases might arise in which an operator mistakenly attempts to remove the liquid agent container 18 from the seal opening device 60. However, as described above, the fixing force of the screw 128 to the circular hole 122 is determined by such factors as the shape of each member in order that the fixing force is weaker than the sum of the fitting force (retaining force) between the first claws 94A and the leg portion 36 and the fitting force (retaining force) between the second claws 96A and the leg portion 36.

Hence if an operator attempts to remove the liquid agent container 18 from the seal opening device 60, fitting of the second claws 96A and the leg portion 36 would remain, and fixing of the screw 128 to the circular hole 122 would be released. Namely, fixing of the screw 128 to the circular hole 122 would be released while the joined state of the connected body 70 and the seal opening device 60 would be maintained.

In this manner, even if an operator mistakenly tries to remove the liquid agent container 18, the joined state between the connected body 70 and the seal opening device 60 is maintained, and fixing of the screw 128 to the circular hole 122 is released. Accordingly, not only is leaking of the sealing agent 32 contained in the liquid agent container 18 suppressed, but also damage to the casing body 16 can be prevented.

The casing body 16 can be re-used due to the casing body 16 not being damaged.

Furthermore, due to adopting a configuration such that the fixing force of the screw 128 to the circular hole 122 can be tuned by increasing or decreasing the grooved portions 124, the fixing force of the screw 128 to the circular hole 122 can be tuned by a simple method.

Figure 9:
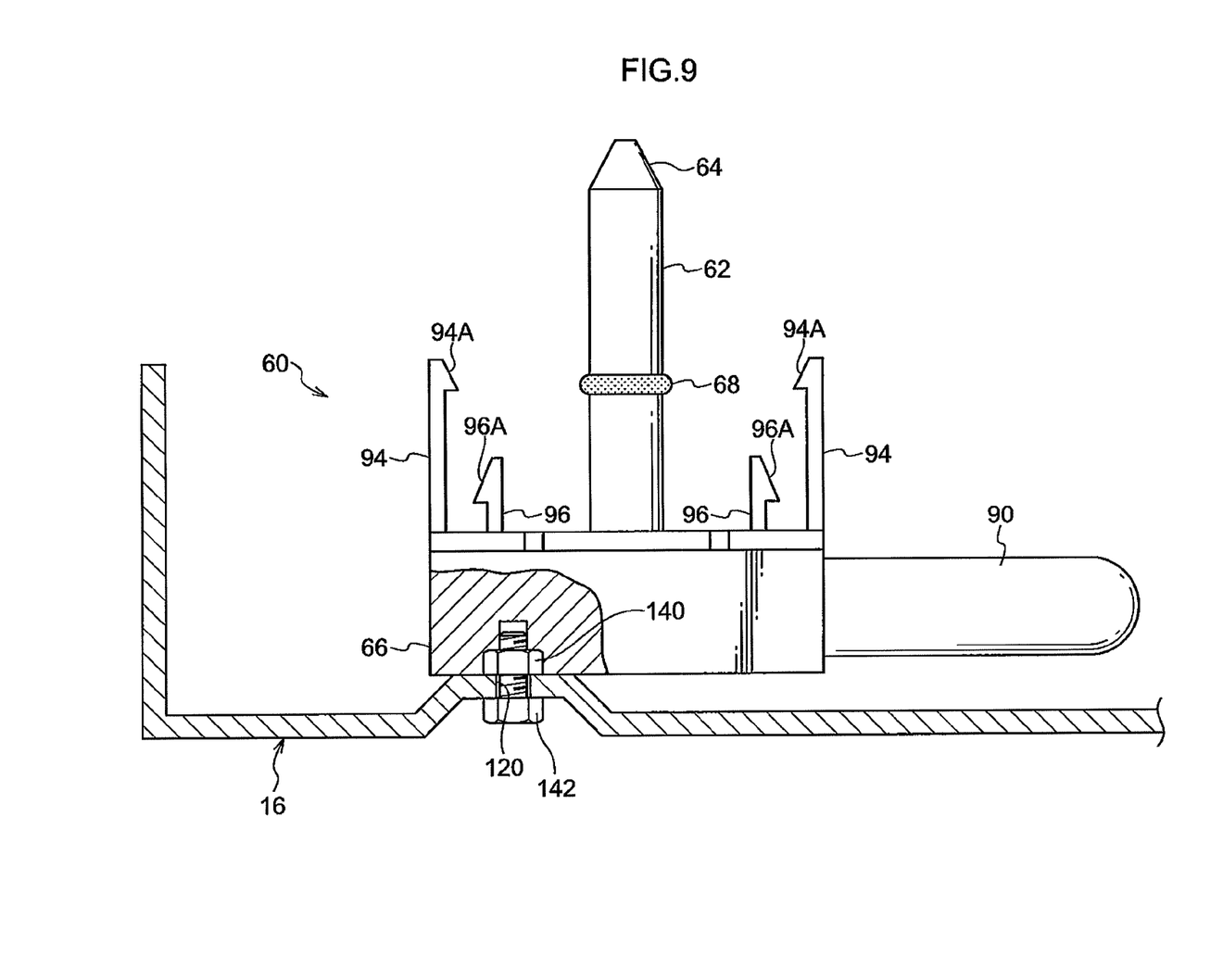
FIG. 9 is a cross-section illustrating a fixing structure of a seal opening device to a casing body employed in a sealing device according to a second exemplary embodiment of the present invention.

Explanation follows regarding an example of a sealing and pump-up device according to a second exemplary embodiment of the present invention, with reference to FIG. 9. Similar members to those of the first exemplary embodiment are allocated the same reference numerals and further explanation thereof is omitted.

As shown in FIG. 9, an nut insert 140 is incorporated into the base portion 66 of the seal opening device 60 so as to be aligned with the through hole 120. A bolt 142 is then threaded from below through the through hole 120 and into the nut insert 140, so as to attach the seal opening device 60 to the casing body 16.

Figure 10:
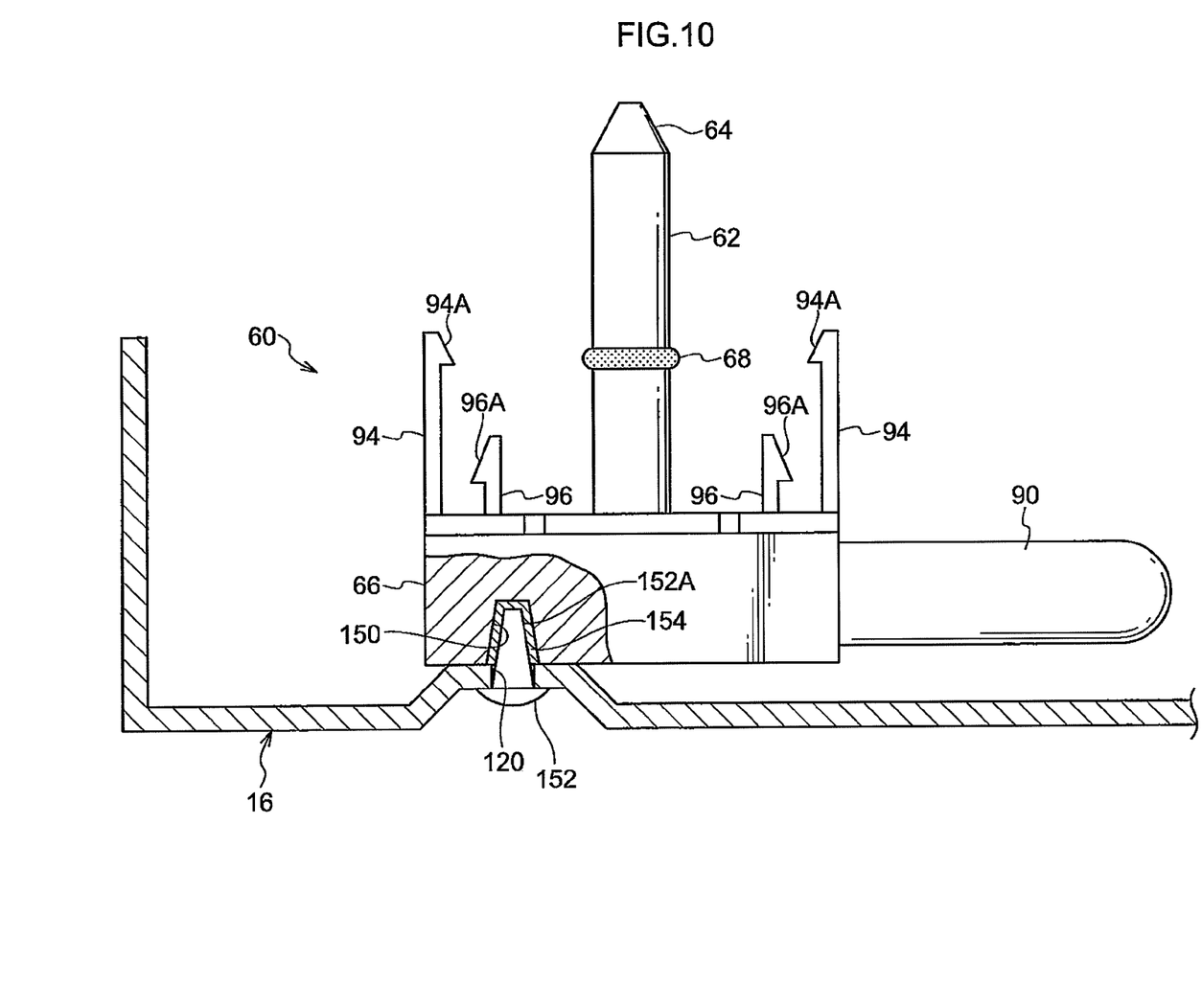
FIG. 10 is a cross-section illustrating a fixing structure of a seal opening device to a casing body employed in a sealing device according to a third exemplary embodiment of the present invention.

Explanation follows regarding an example of a sealing and pump-up device according to a third exemplary embodiment of the present invention, with reference to FIG. 10. Similar members to those of the first exemplary embodiment are allocated the same reference numerals and further explanation thereof is omitted.

As shown in FIG. 10, a circular conical shaped circular cone hole 150 is provided in the base portion 66 of the seal opening device 60 so as to be aligned with the through hole 120 and to widen towards the inside. A neck portion 152A of a pin 152 is inserted from the bottom through the through hole 120 into the circular cone hole 150, and the seal opening device 60 is attached to the casing body 16 by fixing the neck portion 152A into the circular cone hole 150 with adhesive agent 154.

EXPLANATION OF THE REFERENCE NUMERALS

10 SEALING DEVICE (SEALING AND PUMP-UP DEVICE)
12 COMPRESSOR UNIT (COMPRESSED AIR SUPPLY MEMBER)
16 CASING BODY
18 LIQUID AGENT CONTAINER
18A OUTFLOW PORT SECTION
20 INJECTION UNIT

26 ALUMINUM SEAL (SEAL MEMBER)
32 SEALING AGENT
36 LEG PORTION (SEAL OPENING DEVICE RETAINING MEMBER)
54 JOINT HOSE (FLUID JOINT FEED TUBE)
60 SEAL OPENING DEVICE
70 CONNECTED BODY (SEALING AGENT CONTAINER BODY)
94A FIRST CLAW (SEAL OPENING DEVICE RETAINING MEMBER)
96A SECOND CLAW (SEAL OPENING DEVICE RETAINING MEMBER)
100 TIRE
120 THROUGH HOLE (ATTACHMENT HOLE)
122 CIRCULAR HOLE (FEMALE MEMBER)
124 GROOVED PORTION (NON-MESHING PORTION)
128 SCREW (MALE MEMBER)
140 NUT INSERT (FEMALE MEMBER)
142 BOLT (MALE MEMBER)
150 CIRCULAR CONE HOLE (FEMALE MEMBER)
152 PIN (MALE MEMBER)
152A NECK PORTION
154 ADHESIVE AGENT

The invention claimed is:

1. A sealing and pump-up device comprising:
a sealing agent container body for containing a sealing agent, provided with an outflow section for letting the contained sealing agent flow out;
a seal opening device for opening a seal member that seals the outflow section when the sealing agent container body is mounted to the seal opening device;
a seal opening device retaining member for retaining the mounted state of the sealing agent container body to the seal opening device;
a compressed air supply member that is connected to the seal opening device and supplies compressed air into the sealing agent container body sealed with the seal member;
a fluid joint feed tube that is connected to the sealing agent container body and guides, into a pneumatic tire, sealing agent that has flowed out from the outflow section after the seal member is opened by the seal opening device and the compressed air supplied into the sealing agent container body by the compressed air supply member; and
a seal opening device fixing section for fixing the seal opening device to a casing body housing the compressed air supply member, wherein a fixing force of the seal opening device fixing section is weaker than a retaining force of the seal opening device retaining member,
wherein the seal opening device fixing section comprises:
an indentation shaped female member provided to the seal opening device; and
a male member that is inserted through an attachment hole formed in the casing body into the indentation shaped female member to couple to the female member and fix the seal opening device to the casing body.

2. The sealing and pump-up device of claim 1, wherein:
the female member is an indentation shaped circular hole formed in the seal opening device;
the male member is a pin member comprising a circular pillar shaped neck portion for inserting into the circular hole; and
the neck portion of the pin member is fixed to the circular hole with an adhesive agent so as to fix the seal opening device to the casing body.

3. The sealing and pump-up device of claim 1, wherein:
the female member is a nut insert fixed into the seal opening device;
the male member is a bolt for threading into the nut insert; and
the bolt is threaded into the nut insert so as to fix the seal opening device to the casing body.

4. The sealing and pump-up device of claim 1, wherein:
the female member is an indentation shaped circular hole formed in the seal opening device;
the male member is a screw for screwing into the circular hole; and
the screw is screwed into the circular hole so as to fix the seal opening device to the casing body.

5. The sealing and pump-up device of claim 3, wherein:
a non-meshing portion is provided to the nut insert such that the non-meshing portion does not mesh with the bolt; and
the fixing force of the seal opening device fixing section is tuned by increasing or decreasing the non-meshing portion.

6. The sealing and pump-up device of claim 4, wherein:
a non-meshing portion is provided to the circular hole such that the non-meshing portion does not mesh with the screw; and
the fixing force of the seal opening device fixing section is tuned by increasing or decreasing the non-meshing portion.

* * * * *